United States Patent
Zelechonok

[11] Patent Number: 5,906,137
[45] Date of Patent: May 25, 1999

[54] LINEAR DRIVE WITH SCREW AND THREADED FOLLOWER

[75] Inventor: Yury Zelechonok, Northbrook, Ill.

[73] Assignee: Z-Technology, Inc, Northbrook, Ill.

[21] Appl. No.: 08/980,642

[22] Filed: Dec. 1, 1997

[51] Int. Cl.[6] .................................................. F16H 25/02
[52] U.S. Cl. ............................................ 74/459; 411/432
[58] Field of Search .............................. 74/459; 411/432, 411/428

[56] References Cited

U.S. PATENT DOCUMENTS

| | | | |
|---|---|---|---|
| 3,614,900 | 10/1971 | Wahlmark | 74/459 |
| 3,799,292 | 3/1974 | Katz | 411/432 |
| 5,426,989 | 6/1995 | Uhlmann et al. | 74/459 |

FOREIGN PATENT DOCUMENTS

| | | | |
|---|---|---|---|
| 1242252 | 8/1960 | France | 74/459 |

*Primary Examiner*—Charles A. Marmor
*Assistant Examiner*—Chong H. Kim
*Attorney, Agent, or Firm*—Charles F. Lind

[57] ABSTRACT

This linear drive has cooperating threaded screw and follower components suited to be rotated relative to one another to create a corresponding axial shift between the components, where the follower is improved by having spaced drive members each threadably cooperating with the screw and capable of carrying the maximum axial linear drive force between the components. Anti-friction structures support the drive members for allowing relatively effortless component rotation, frictionwise, even under this maximum driving force. Ramp structures cyclically expand and contract the axial separation between the drive members, which both generates the maximum axial driving force and effectively shifts the axial driving force alternately between the drive members. The force-carrying drive member will be thread friction bound relative to the screw, and the substantially loadfree drive member will be easily rotatable with the follower rotation suited to be axially advanced along the screw. Relative component rotation and repeated expanding and contracting shift cycles incrementally and alternately advance, with an inch-worm like action, the drive members along the screw to provide the axial shift and force generation between the components, the loadfree drive member being advanced and the force-carrying drive member remaining stationary relative to the screw.

16 Claims, 11 Drawing Sheets

LINEAR DRIVE WITH SCREW AND THREADED FOLLOWER

FIELD OF THE INVENTION

This invention relates to linear drives or actuators, particularly of the type having a threaded screw and a follower cooperating threadably thereon, whereby relative rotation of the screw and follower advances the follower axially along the screw.

BACKGROUND OF THE INVENTION

A nut cooperating threadably with a helically threaded screw can be adjusted to specific locations axially along the screw, by and upon relative rotation of the nut and screw. Axial forces can further be generated by the axial advance of the nut along the screw, but as the axial forces are increased, the friction between the cooperating threads is also increased, making nut rotation on the screw more difficult and only upon using higher torquing forces.

In order to overcome friction between the sliding cooperating threads, commercial linear actuators utilize a ball-screw mechanism that axially keys the screw and follower together while providing a rolling support therebetween. Such linear actuators will operate on reduced torque in providing relative screw-follower rotation and/or will provide for more efficient or easily generated axial forces or for smoother axial/rotational movements between the screw and follower, compared to direct sliding threads that generate high thread friction.

However, such typical linear actuators also provides several challenges or drawbacks, including: (1) the cooperating thread profile must be modified so that bearings balls can be fitted between the threads on the screw and follower, being more costly and/or more difficult to inventory to satisfy different specific applications; (2) the follower is free wheeling on the screw, requiring that many applications might need some form of locking mechanism to hold the instantaneous actuator position fast in the event of loss of actuating electrical power or the like; (3) the ball contact with the adjacent threads is across a point or small localized area, generating concentrated mechanical stresses against the threads that might damage them unless such were made of costly hardened materials, particularly when the linear drive is generating large axial forces between the screw and follower; and (4) routing mechanism spaced from the threads is needed to return the bearing balls from one follower end to the other to follower end, providing for an endless availability of balls to have only ball rotation between the threads, but again adding both size and costs to the linear drive.

The invention to be disclosed herein deviates from the noted approach, and advantageously utilizes the fact that friction between sliding threads of cooperating screw and nut components, and the force needed to turn the nut on the screw, increase and decrease as the axial load or force between the component threads are respectively increased and decreased.

SUMMARY OF THE INVENTION

Basic objects of this invention are to provide a linear drive or actuator that overcomes the challenges or drawbacks of conventional linear actuators, by having no special profile threads or ball routing mechanism, by having no bearing ball cooperation with or forces applied against the screw or follower component threads, and by being self-locking even when not powered.

Another general object of the invention includes providing a linear drive having screw and follower components, threadably cooperating with one another on generally standard helically configured threads, but having increased capacity for generating axial forces when compared to using standard nut and screw components in the conventional manner.

A more detailed object of the disclosed invention provides having separate drive members each threadably cooperating with the screw and capable of carrying a maximum axial force generated in the linear drive, and intermittently operated lift means between the follower and drive members for generating the maximum axial driving force, without requiring relative rotation and associated relative cooperating thread movement between the screw and any drive member that might be carrying a significant percentage of the axial forces of the linear drive.

Other detailed objects, features, and generalized modes of operation of the invention include providing a linear drive having a follower comprised of spaced drive members each threadably cooperating with the screw and capable of carrying by itself a maximum axial driving force between the follower and screw and independently rotatable along the screw, with anti-friction means between the drive members and follower allowing effortless drive member rotation relative to the follower even under this maximum driving force, and also having independent lift means capable of generating this maximum axial driving force between the follower and drive members and cyclically operated for changing the axial separation between the drive members and for shifting the axial driving force from one drive member to the other and thereby creating a force-carrying drive member which is friction bound on the screw and a substantially loadfree drive member which can be rotated on and axially advances relative to the screw, so that repeated such cycles provide that both drive members are incrementally and alternately advanced, one at a time and with an inch-worm like action, along the screw to advance the follower then also axially along the screw.

BRIEF DESCRIPTION OF THE DRAWINGS

These and other objects, features or advantages of the invention will be more fully understood and appreciated after consideration of the following description of the invention, which includes as a part thereof the accompanying drawings, wherein:

FIG. 8a–e are schematic illustrations of sequential transfer positions between the drive members and screw during relative rotation in one direction between the screw and follower;

FIG. 9a–e are schematic illustrations of sequential transfer positions between the drive members and screw during relative rotation the opposite direction between the screw and follower;

DETAILED DESCRIPTION OF PREFERRED EMBODIMENTS OF THE INVENTION

A first embodiment of the linear drive 8 is disclosed herein in FIGS. 1–7, and utilizes a cylindrical follower 10 and a screw 12 concentrically extended through the follower. The follower 10 has an annular housing 13, and contained within the follower housing are spaced thrust or end members 14 and 22, spaced threaded drive members or nuts 16 and 20, and an intermediate member 18. The respective adjacent follower members 14, 16, 18, 20 and 22 are separated by anti-friction means 15, 17, 19 and 21, such as needle or roller bearings, to allow rotation of the respective adjacent members relative to one another. End retainers 24 and 26 are trapped in annular groves in the housing 13, the retainers preferably being of spring material and shaped both to bias the members axially together resiliently to keep them and the anti-friction means in contact while contained within the housing and to flex apart to allow slight axial separation of the drive members 16, 20 during linear drive operation.

Figure 1:
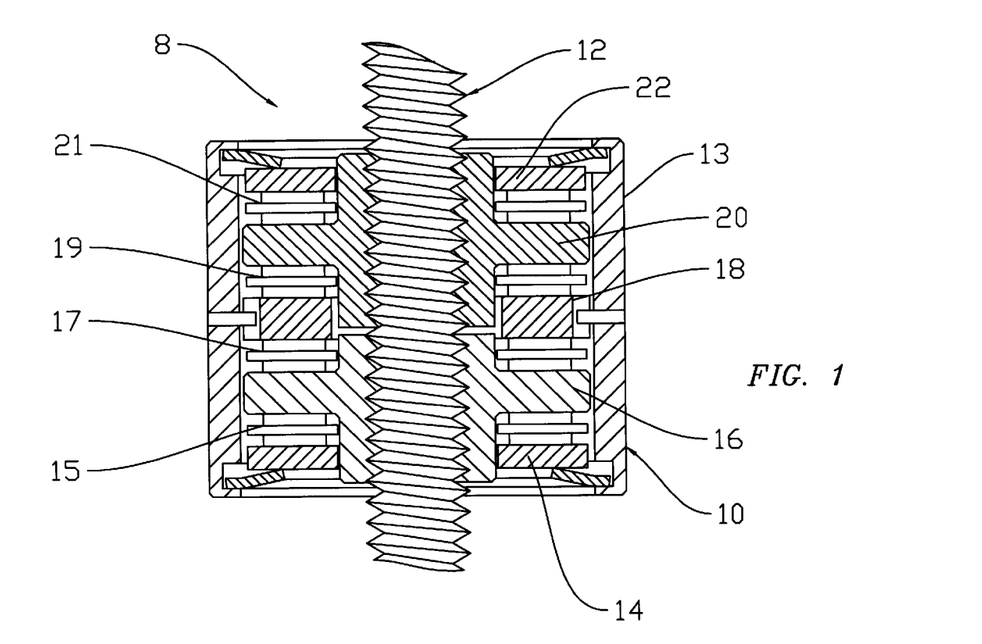
FIG. 1 is a central sectional view of a first embodiment of the linear drive formed according to the invention.
Figure 2:
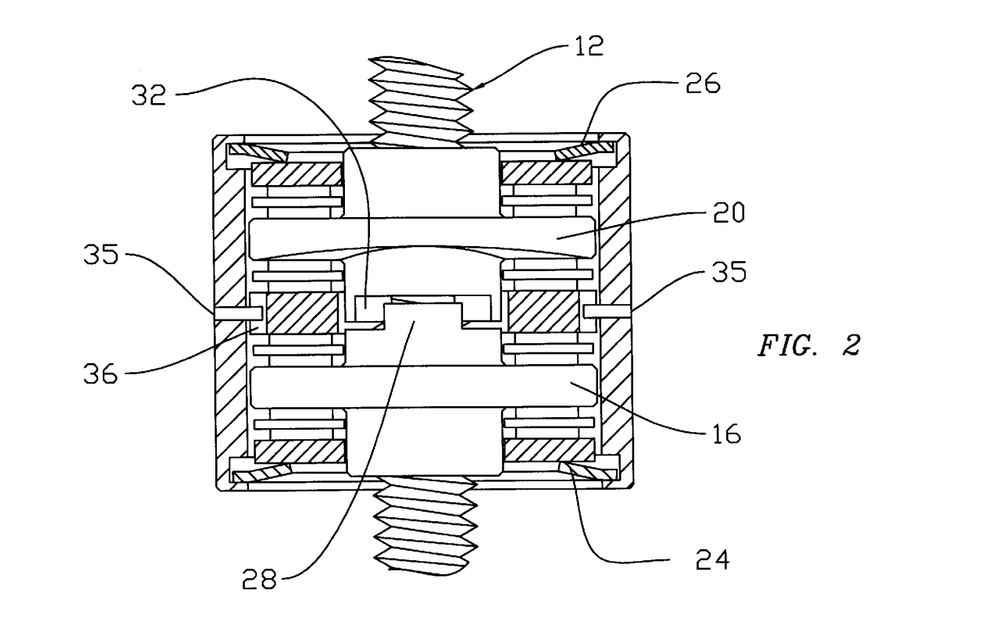
FIG. 2 is sectional view similar to FIG. 1, except showing the two drive members of the follower in elevation, for added clarity of the invention.
Figure 3:
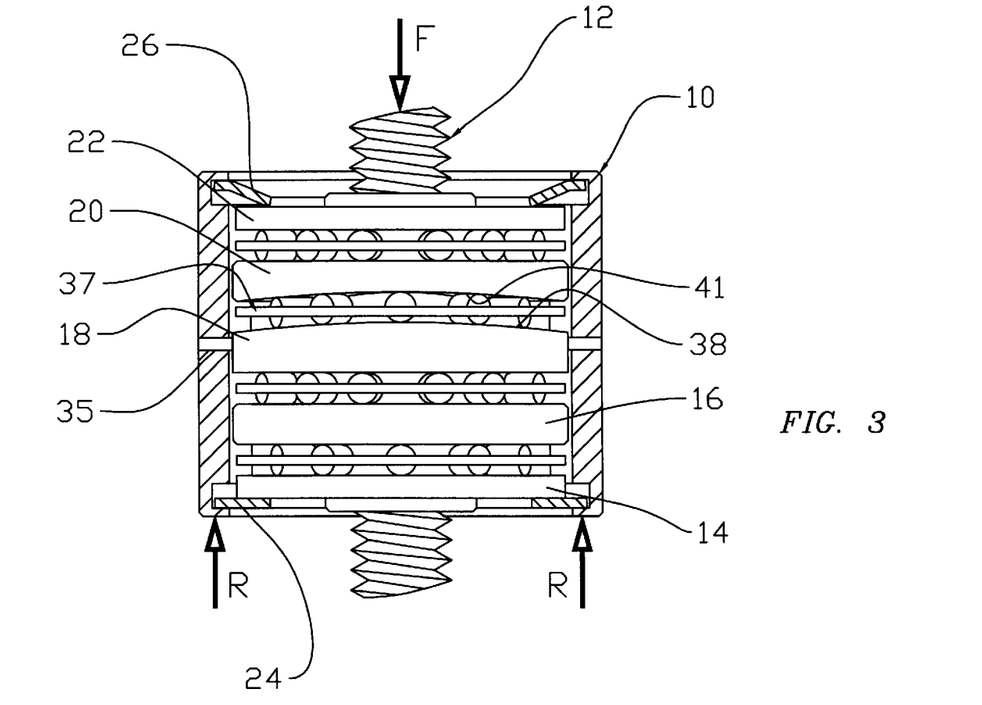
FIGS. 3 and 4 are elevational views, except for the follower housing, of the linear drive of FIGS. 1 and 2, specifically showing the ramp contours of adjacent intermediate and drive members in the contracted and expanded operative positions, respectively.

The follower end members 14, 22 can be flat annular discs that fit with radial clearance from the screw 12 or drive member hubs and the follower housing 13, to be both freely rotatable relative to the screw and axially movable within the housing. However, the end members 14, 22 and end retainers 24, 26 and follower housing 13 will all rotate together or with a common movement.

The drive members 16, 20 can have axially extended hubs 27, 31 respectively, each with a threaded bore that cooperates with the screw, preferably over an axial extent along the screw to reduce binding of the cooperating threads should the drive member be torqued crosswise of the longitudinal axis of the screw. The adjacent ends of the hubs 27, 31 further are notched crosswise of the screw receiving bore to define alternate tabs 28, 32 and notches that couple the hubs together, while allowing both limited axial and rotational drive member movements relative to one another (see FIG. 6 for the allowable rotational arc "a" between where the tabs of the different drive members hit one another). Rigid radial discs 29, 33 centrally extended off of the hubs 27, 31 have peripheral clearance from the follower housing 13, allowing both free rotation and axial movement of the drive members 16, 20 relative to the housing.

The intermediate follower member 18 is rotatably keyed to the follower housing 13, as by pins 35 projected off of the housing and fitted in axial grooves 36 on the member 18. This also allows axial movement of the follower member 18 relative to the follower housing. The intermediate member 18 further can be axially and rotatably moved relative to both the screw 12 and the adjacent drive members 16, 20.

Figure 4:
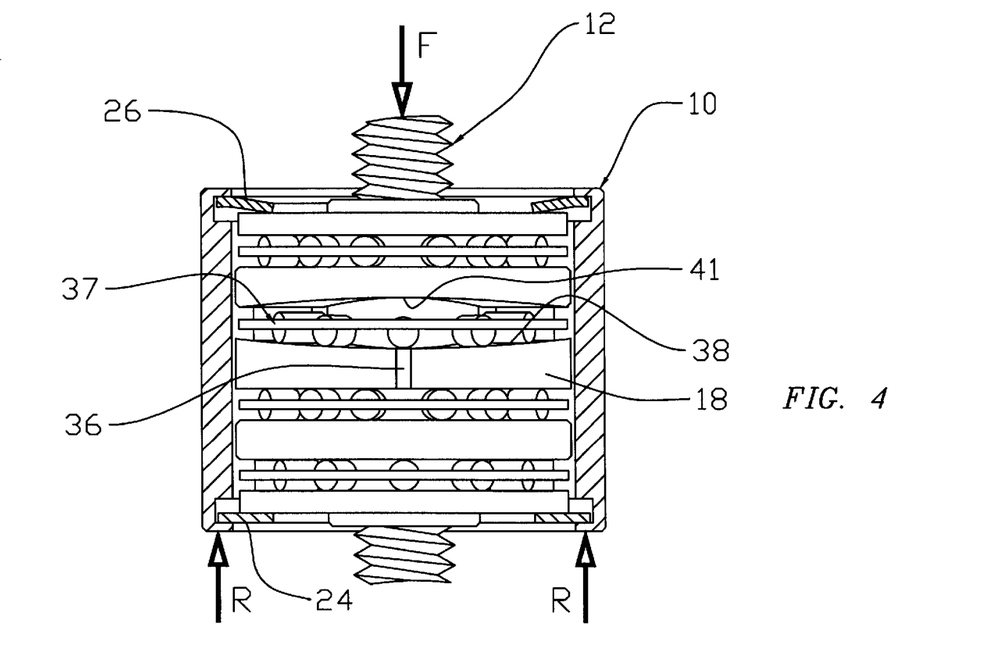
Figure 5:
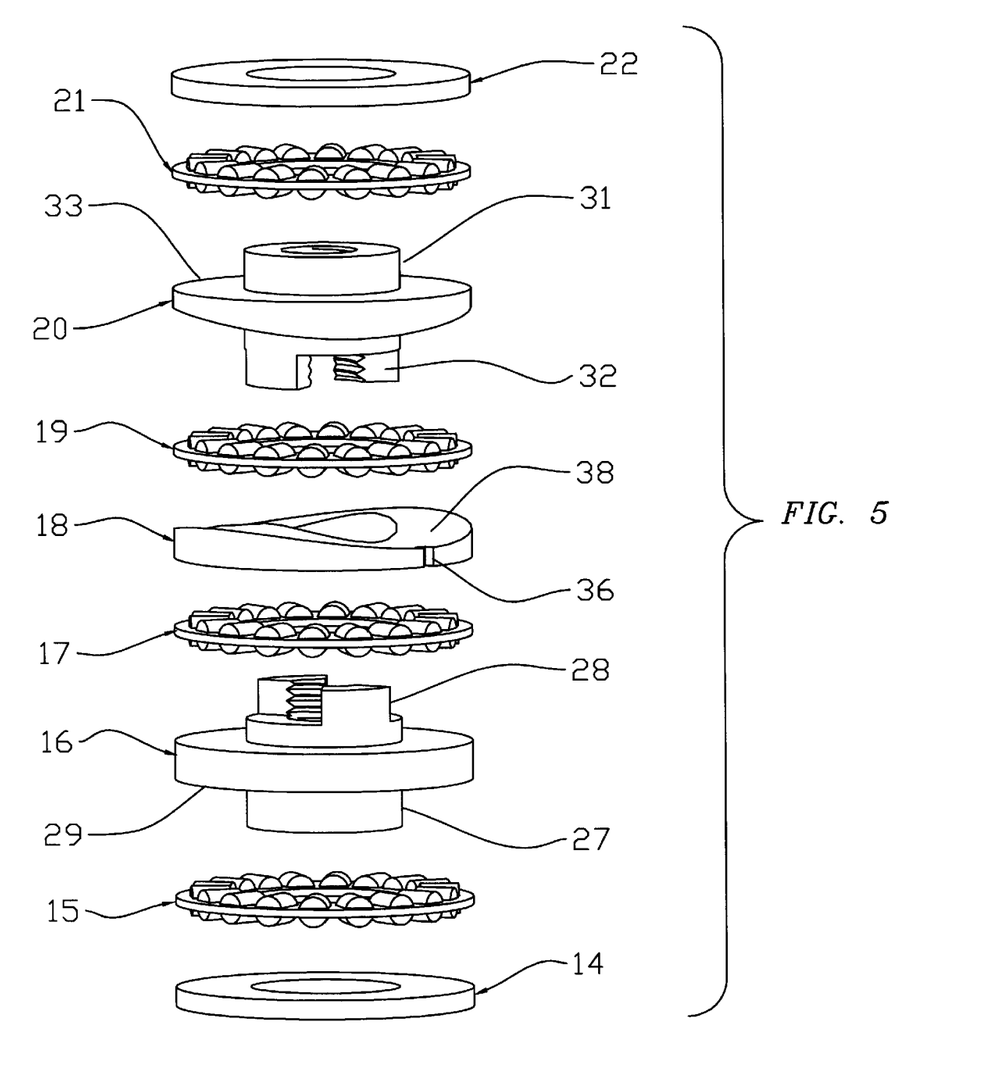
FIG. 5 is an exploded perspective view of the operating components used in the linear drive of the previous figures.
Figure 6:
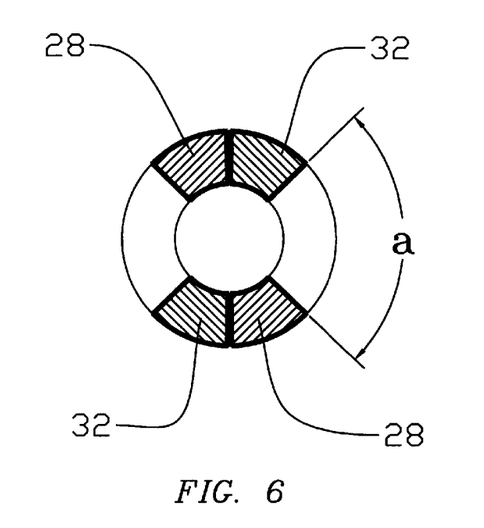
FIG. 6 is a cross section view illustrating the coupling interlock between the two drive members.

The adjacent faces 38, 41 of the intermediate member 18 and the drive member 20 are wavy and substantially complementary to create a ramp structure 37 (illustrated in FIG. 7 as a plan development of one full rotation thereof) having two high point humps 39 spaced 180 degrees apart and two low point valleys 40 likewise spaces 180 degrees apart and 90 degrees from the adjacent high point humps. The faces 38, 41 of the ramp structure 37 can be contoured to correspond to the axial advance of the helical thread on the screw 12, providing an expanding segment "e" and a contracting segment "c". The ramp structure 37 will provide an axial lift equal to the differential between the humps and valleys, occurring when the ramp structure might be shifted between low lift or contracted position with the humps nested in the opposite valleys (FIGS. 1, 2 and 3) and the high lift or expanded position with the humps aligned opposite one another (FIG. 4).

In the low lift or contracted position of the ramp structure 37 (see FIG. 3), the drive member 20 will have its minimum separation from the end member 14, while in the high lift or expanded position of the ramp means (see FIG. 4), the drive member 20 will have its maximum separation from the end member 14. The schematic illustrations of FIGS. 8 and 9 might be useful in understanding the operation of the disclosed linear drive 8.

To provide for operation of the linear drive 8, the follower housing 13 and screw 12 will have the respective longitudinal axes aligned or coincidental, with the follower housing 13 supported and rotatable (shown schematically in FIGS. 3 and 4 by arrows R adjacent end member 14) such as by thrust bearings or the like to counteract or oppose load or force F on the nonrotatable screw 12. When under any significant load or force up to the maximum force F, R, the end retainer 24 will be flexed flat, while the opposite end retainer 26 will be flexed differently, corresponding to the axial movement of the drive member 20 when shifted by the ramp faces 38, 41 being rotated between the low and high lift positions (FIGS. 3 and 4) respectively.

With the ramp structure 37 in the low lift or contracted position (see FIG. 3), the axial force F, R between the screw and follower might be distributed between the drive members 16, 20, whereupon relative rotation in the proper direction of the screw 12 and follower 10 will cause the rotating ramp structure 37 between the drive member 20 and intermediate member 18 to be axially expanded as along segment "e" (see FIG. 8a), lifting the drive member 20 away from follower end member 14 and the drive member 16 supported thereagainst by anti-friction means 15. This lifting movement will cause the cooperating threads between the drive member 20 and screw to carry a greater percentage (eventually all) of the axial force F, R, to have the increased thread friction rotatably bind the drive member 20 and screw together. However, continued relative screw and follower rotation will be allowed because of the anti-friction means 19, 21 between the drive member 20 and follower housing 13. During this expanding or lifting phase of the operating cycle (FIG. 8*a*), the axial force F, R between the screw and follower will be directed by the screw and drive member 20 via its disc 33, and the stacked intermediate member 18, drive member disc 29 and end disc 14, separated by anti-friction means 19, 17 and 15, to the follower housing 13 adjacent end retainer 24. The lifting action further will reduce the percentage of axial force F, R the drive member 16 carries (ultimately to none, see FIG. 9*b*), to reduce thread friction between drive member 16 and the screw, allowing even the minor drag forces of rotation that anti-friction means 17, 15 create on the now substantially loadfree drive member 16 to rotate the drive member 16 in the same direction that the follower is being rotated relative to the screw. This rotation will thread the drive member 16 axially along the screw, at a maximum rate that would keep pace with the axial shift of the drive member 20 riding up the expanding segment "e" of the ramp means.

Figure 7:
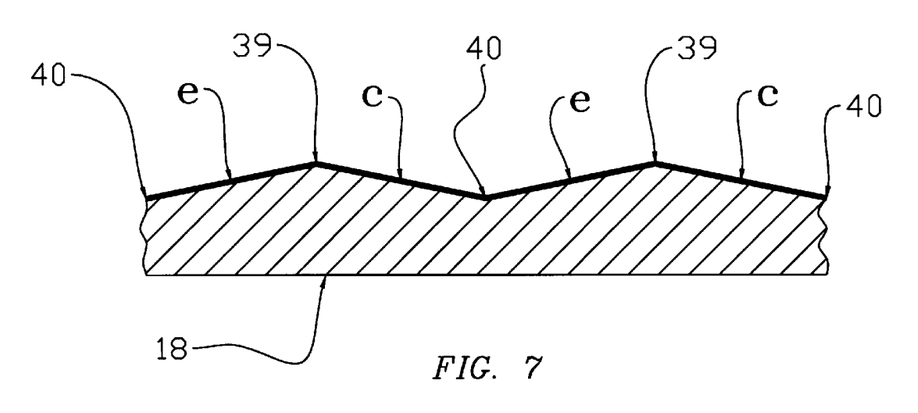
FIG. 7 is a plan developmental of the ramp means used in the linear drive of the previous figures.

With the two hump ramp structure illustrated in FIG. 7, after approximately 90 degrees of screw and follower relative rotation, the rotating ramp structure between the intermediate member 18 and drive member 20 will have the high point humps 39 aligned (the maximum lift position as illustrated in FIGS. 4 and 8*b*), and the drive member 20 will be at its furthest separation from the follower end member 14. Upon continued screw and follower rotation, the contracting ramp contour "c" (see FIG. 8*c*) will then allow the drive member 20 to close toward the end member 14 and transfer the axial forces from drive member 20 to drive member 16, which will now become friction bound to the screw and the drive member 20 (see FIG. 9*d*) will become loadfree and will be rotated with the housing 12 and threaded axially along the screw to close the gap between the drive member 20 and the follower end member 14. During this contracting phase of the operating cycle, little or no axial shifting between the screw and follower might take place, and the axial force F, R between the screw and follower will be directed by the screw and drive member 16 via its disc 29, and the anti-friction means 15, to the follower housing 13 at end retainer 24. When the ramp structure 37 again is aligned in the nested low lift position (see FIG. 8*d*), the next lifting or expanding phase of the lifting cycle can begin again (see FIG. 8*e*, which is similar to FIG. 8*a*).

FIGS. 9*a–e* illustrate the screw and follower interaction upon reversing the direction of relative rotation compared to FIGS. 8*a–e*, for lowering the screw, which will take place when the axial force is carried by drive member 20 via ramp contour "e" (FIG. 9*d*) in moving between high point position 39 (FIG. 9*c*) and low point position 40 (FIG. 9*e*). During this contracting phase, drive member 16 will be loadfree, and rotated and threaded along the screw to close the drive members separation to the low point position (FIG. 9*e*). As the low point position is passed (moving to FIG. 9*a*), the axial force will shift from drive member 20 to drive member 16, and ramp segment "c" will be expanding the drive member separation, but the magnitude of the ramp lift will be about the same as or less than the retreating screw thread, keeping drive member 20 loadfree and freely rotatable to be threaded along the screw toward the maximum separation condition (FIG. 9*c*). However, just before reaching the maximum separation high point 39, the drive members will be coupled together by the engaged tabs 28, 32 (FIG. 9*b*) whereby free rotation of drive member 20 is stopped which is then carried by ramp segment "c" to provide a small lift displacement "h" (FIG. 9*c*), making the drive member 16 loadfree. As noted above, the drive member 20 will then be carrying the axial force F, R along the ramp contour "e" to both lower the screw and allow the loadfree drive member 16 to be freely rotated along the screw to contract to the closest drive members separation at the low point position 40 (FIG. 9*e*).

In the disclosed linear drive 8, the screw and cooperating drive member threads might be of a helical configuration, uniformly pitched, and will have a lead or axial advance per revolution that is less than the coefficient of friction or pitch of the threads (as a conventional machine screw will have). Thus, the linear drive will be self-locking and will remain in any set position, without power being applied to rotate or retain the screw and follower in place. The ramp structure lift could be just slightly less than one-quarter of the lead of the screw thread (with a two hump ramp structure as illustrated) in FIG. 7, just slightly less than one-half of the lead of the screw thread (on a one hump ramp structure to be disclosed), or just slightly less than the fraction equal to one-half divided by the number of complementary highs and lows per relative revolution of the screw and follower for ramp structures having more than two sets of equally spaced complementary highs and lows per relative screw-follower rotation; although it could also be smaller. The threaded cooperation between the screw 12 and drive members 16, 20 need not be tight or extremely precise, and might even have some free play, meaning that the linear drive can utilize most any typical machine screw and its cooperating nut.

The drive members 16, 20, during the assembly of the linear drive, can be threaded sequentially onto the screw with a greater axial separation than might be achieved upon relative member rotation allowed with the rotational angle "a" between engagement of the adjacent tabs 28, 32, thereby keeping the drive members separated axially but in the proper related position throughout linear drive operation. During such linear drive operation, essentially only one of the drive members will be force-carrying and the other drive member will be substantially loadfree. A preferred free play of rotation "a" between the adjacent drive members 16, 20 might be slightly less than the rotational angle needed for completing one expanding or contracting phase of the operation cycle (one-quarter turn of a two hump ramp or one-half turn of a one hump ramp).

With the axial force F, R as illustrated, the linear drive 8 can be operated with relative rotation between the screw and follower accomplished by either rotating the follower 10 with the screw 12 held nonrotatably, or vice versa; and relative screw and follower axial shifting can be accomplished by either the screw axially shifting with the follower housing held axially fixed, or vice versa. Further, axial shifting between the screw and follower will generally occur only incrementally, and only during approximately one-half of each relative rotation between the screw and follower, and then when axial load is being supported via the drive member 20 and ramp structure contour "e" in being shifted between the low and high lift points (in raising the screw) and between high and low lift points (in lowering the screw). Correspondingly, no axial shifting will occur over approximately the other half of relative screw-follower rotation, where then drive member 16 is carrying the axial force and drive member 20 is loadfree and is being threaded back to the contracted condition (for lifting the screw) or expanded condition (for lowering the screw). However, all axial shifting actions of the linear drive 8 will be generated by the ramp structure 37, and without relative rotation between the screw and any force-carrying drive member; whereby the axial force generating capacity is greatly increased, compared to direct rotation of a force-carrying threaded member frictionally sliding on a screw.

Alternative ramp structures 37a, 37b, 37c and 37d are disclosed in FIGS. 10–12, 13 and 14, 15, and 16–18, respectively which could be used in the linear drive 8 of FIGS. 1–7 for generating the axial forces relative to and/or between the drive members and the follower housing, and for alternately shifting the axial forces between the drive members to product force-carrying and loadfree drive members for allowing free rotation and axial threading of the loadfree drive member along the screw.

Figure 10:
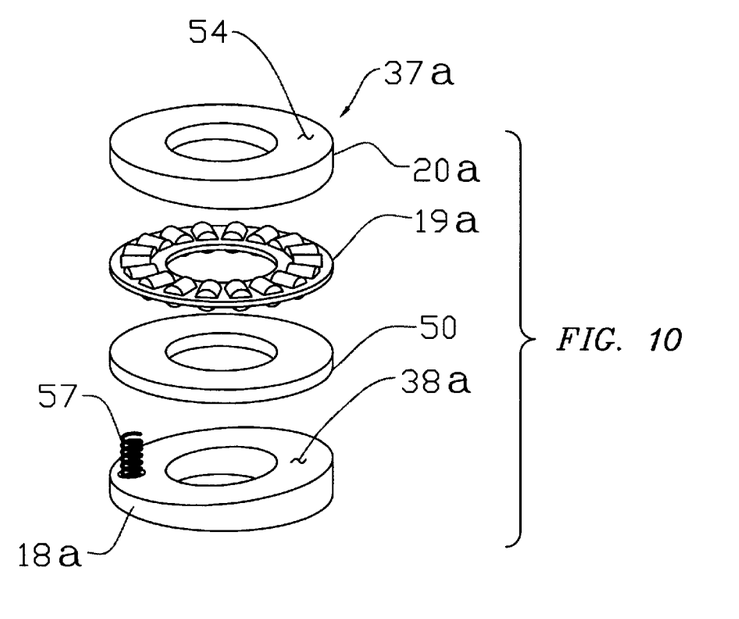
FIG. 10 is an exploded perspective view of operating components of a modified ramping structure that can be used in the linear drives disclosed herein.
Figure 11:
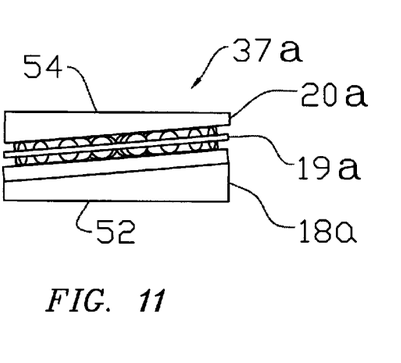
FIGS. 11 and 12 are elevational views of the components of FIG. 10, showing them in the contracted and expanded operative positions, respectively.
Figure 12:
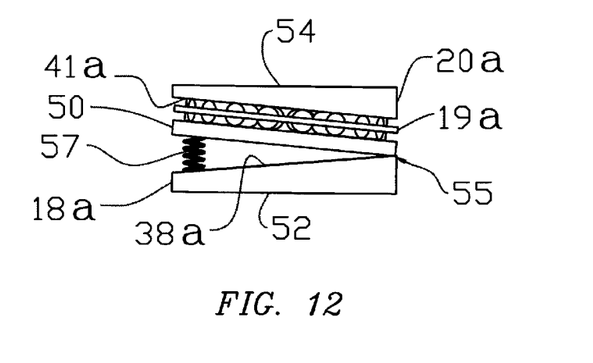

FIGS. 10–12 show a one-hump ramp structure 37a that has adjacent rigid annular members 18a, 50 and 20a, with a full cage of roller bearing anti-friction means 19a between the members 50, 20a; the members 18a, 20a corresponding somewhat to the members 18 and 20 in the ramp structure 37. The outward faces 52, 54 respectively on the members 18a, 20a are substantially flat and parallel, and are normal to the longitudinal center axes of the members; while the inward faces 38a, 41a respectively on the members 18a, 20a are angled relative to the center axes of the members and are substantially flat or contoured for the anti-friction means 19a. The member 50 might have its opposite faces substantially flat or countered for the anti-friction means 19a. The members 18a, 50 pivot relative one another at an abutment region along one axial edge 55, the members being nonrotatably keyed together along this edge 55. A spring 57 trapped compressibly between the adjacent faces of the members 18a, 50, at locations spaced near the opposite axial edge 55 of the members, biases the member faces apart resiliently to an expanded configuration of FIG. 12 but when totally compressed allows the faces to lie close together in the contracted configuration of FIG. 11. Members 18a, 50 might be rotatably keyed to a follower housing (not shown but like 13) while being axially movable relative to the follower housing; and further might be axially and rotatably movable relative to both the screw (not shown but like 12) and the adjacent member 20a, (or other drive members, not shown, but like drive members 16, 20). The member 20a might be threaded onto the screw. The entire ramp structure 37a might be contained within a follower and its associated components (like in FIG. 5) between anti-frictions means 17, 21, replacing the separate members 18 and 20 and the anti-friction means 19.

Figure 8:
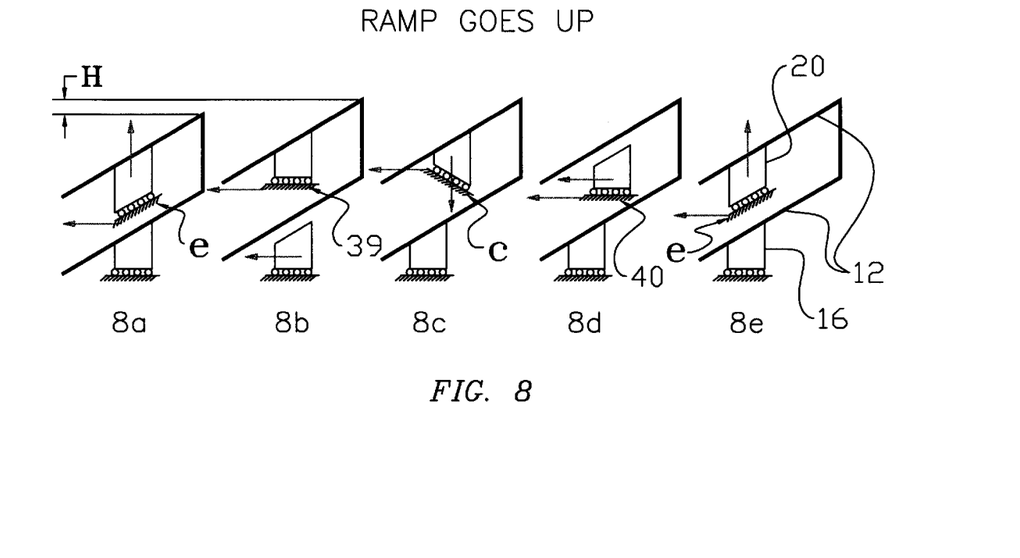
Figure 9:
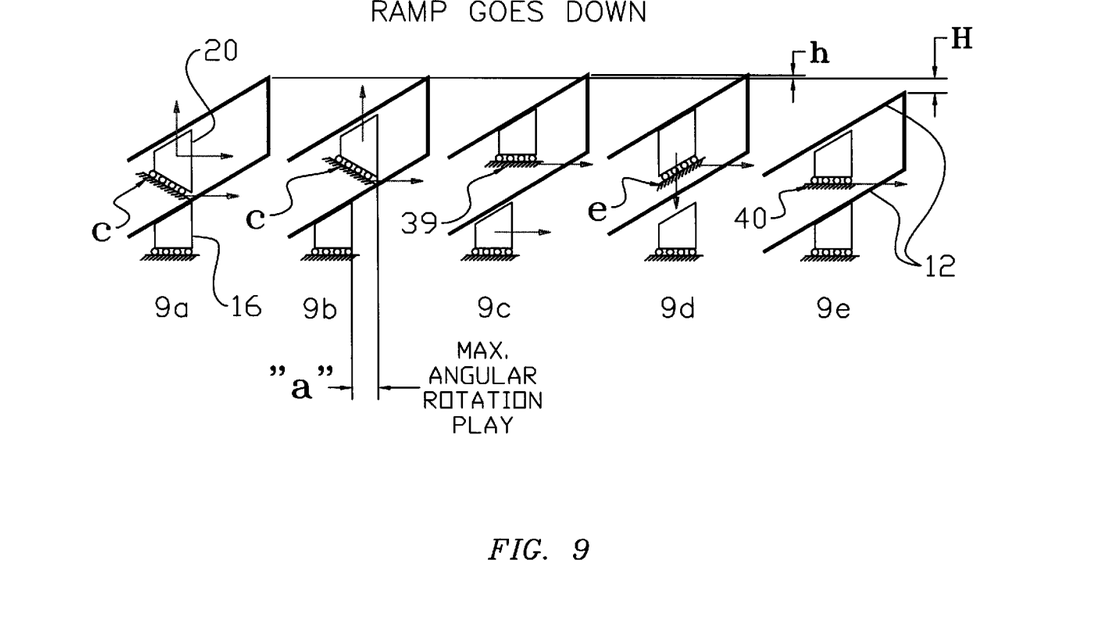

When ramp structure 37a is so assemblied and upon rotation between the linear drive follower and screw, the corresponding relative rotation of the ramp structure members 18a, 50 and 20a will axially shift the members 18a, 20a between the contracted condition of FIG. 11 and the expanded condition of FIG. 12 (the differential of separation between the outward surfaces 52, 54 being effectively the axial shift, like "H" in FIGS. 8 and 9, allowing the respective then loadfree drive member 16, 20 (or 20a) to be correspondingly threaded toward or away from one another. With the one hump configuration of the ramp structure 37a, one contracting and expanding cycle will occur with each full relative rotation between the screw and follower. Advantages of this lift structure 37a might be the continuous contact over the full relative rotation of the ramp structure of the anti-friction means 19a against the bearing faces of the members 20a, 50, and the uniform distribution of the bearing load and all roller elements of the anti-friction means, as the screw and follower are rotated relative to one another.

Figures 13, 14:
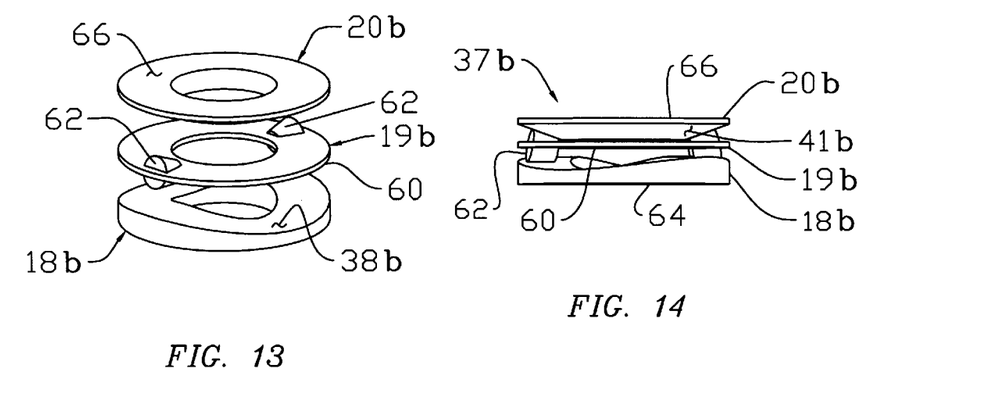
FIG. 13 is an exploded perspective view of operating components of yet another ramping structure that can be used in the linear drives disclosed herein.
FIG. 14 is an elevational view of the components of FIG. 13, showing them in an intermediate operative position.

FIGS. 13 and 14 show a two-hump ramp structure 37b that has adjacent rigid annular members 18b, 20b, with anti-friction means 19b between the members; the members 18b, 20b corresponding somewhat to the members 18 and 20 in the ramp structure 37. The outward faces 64, 66 respectively on the members 18b, 20b are substantially flat and parallel, and are normal to the center axes of the members; while the inward face 38b on the member 18b is wavy (having a two-hump ramped contour similar to the face 38 in FIGS. 1–7) and the inward face 41b on the member 20b is tapered or contoured for antifriction means 19b but otherwise is normal to the center axes of the members. The member 18b would be rotatably keyed to a follower housing (not shown but like 13) while being axially movable relative to the follower housing; and further would be axially and rotatably movable relative to both the screw (not shown but like 12) and the adjacent member 20b, (or other drive members, not shown, but like drive members 16, 20). The member 20b could be threaded onto the screw. The anti-friction means 19b might have a cage 60 with only a pair of bearing rollers 62 spaced 180 degrees apart and sized to fit between the members 18b and 20b.

When ramp structure 37b is so assemblied and upon rotation between the linear drive follower and screw, the ramp structure 37b will axially shift the members 18b, 20b between fully contracted and expanded conditions (neither being shown)r allowing the respective loadfree drive member 16, 20 (or 20b) to be correspondingly threaded toward and away from one another. With the two-hump configuration of the ramp structure 37b and the two-roller anti-friction means, two contracting and expanding cycles will occur with each full relative rotation between the screw and follower. An advantage of this ramp structure again might be the uniform load distribution on the two opposite rollers 62 of the anti-friction means 19b, continuously and over the full ramp structure rotation.

While not shown but equally workable, the ramp structure of FIGS. 13 and 14 might have the anti-friction means modified to have three or more bearing rollers equally spaced apart, and have a corresponding number of humps on the wavy face on the member 18b, with the alternate high and low point positions equally spaced (60 degrees spacings for three hump, 45 degree spacings for four humps, etc.). With the higher number of humps, additional contracting and expanding cycles will occur with each full relative rotation between the screw and follower, thereby allowing a smaller differential between the high and low point positions of such ramp structure while yielding the same overall axial shift per revolution. The simultaneously acting additional rollers also would reduce the continuous load each roller would carry, which might be advantageous.

Figure 15:
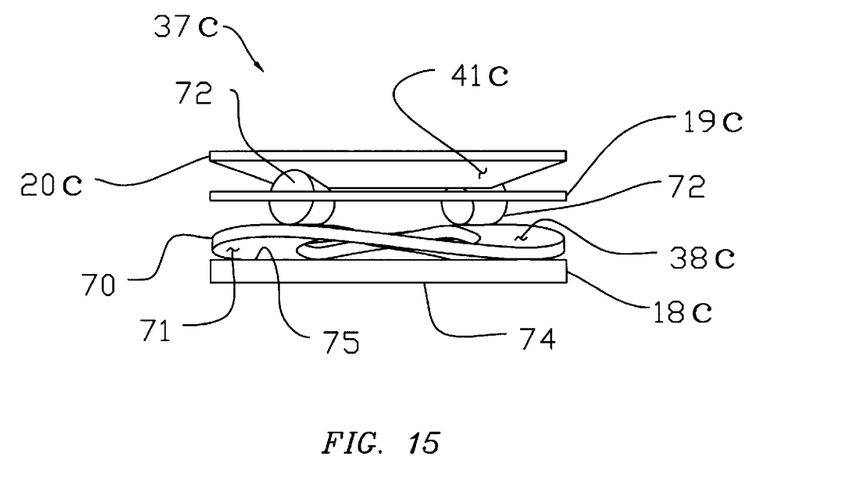
FIG. 15 is an elevational view of operating components of yet another ramping structure that can be used in the linear drives disclosed herein, showing them in an expanded operative position.

Another ramp structure 37c is illustrated in FIG. 15, closely related to the ramp structure 37b of FIGS. 13 and 14; but having an operative concept that can be used in any of the ramp structures illustrated and disclosed herein. Specifically, the ramp structure 37c is provided with a resilient and deformable structure 70 that under excessive loads or forces might temporarily collapse to decouple the drive system, thus serving as a torque limiter that would reduce the risk of permanently damaging any costly component of the system. The resilient member 70 might be in the form of a disc of substantially uniform axial thickness, having opposite wavy faces 38c, 71, each having a two-hump ramped contour similar to FIG. 7. Anti-friction means 19c operate between the wavy face 38c of member 70 and the contoured face 41c of the member 20c. Member 20c might be rigid and threaded to cooperate with the screw (not shown but like 12). Members 18c might also be rigid, in the form of a disc having opposite faces 74, 75 each substantially flat, parallel and normal to the center axes of the members, and members 18c and 70 might be rotatably keyed to a follower housing (not shown but like 13) while being axially movable relative to the follower housing and axially and rotatably movable relative to both the screw and the adjacent member 20c. The member 70 might be formed of a tough but resilient material, such as spring steel, so that its wavy configuration between the rollers 72 of anti-friction means 19c and the flat member face 75 would allow the face 71 opposite the high position points on face 38c to be axially deformed until contact with face 75, reducing the effective lift of the ramp structure 37c if totally collapsed to zero. This would allow continuous rotation between the screw and follower, without any effective shift between these components.

Figure 16:
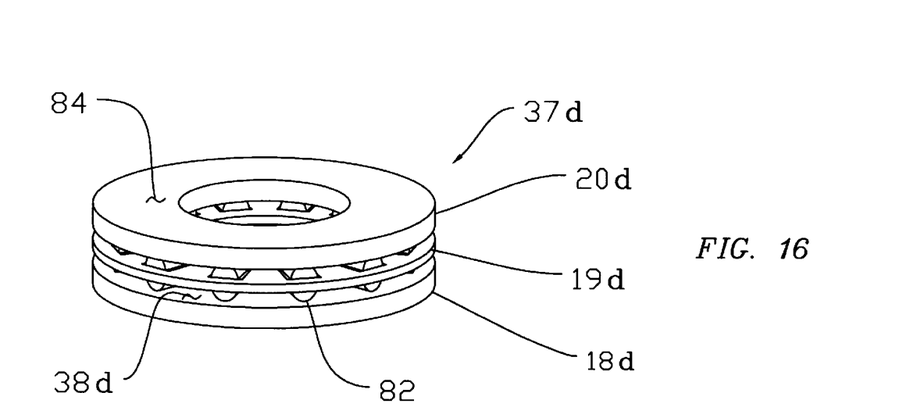
FIGS. 16, 17 and 18 are perspective views of operating components of yet another ramping structure that can be used in the linear drives disclosed herein, showing them in the expanded, intermediate and contracted operative positions, respectively.
Figure 17:
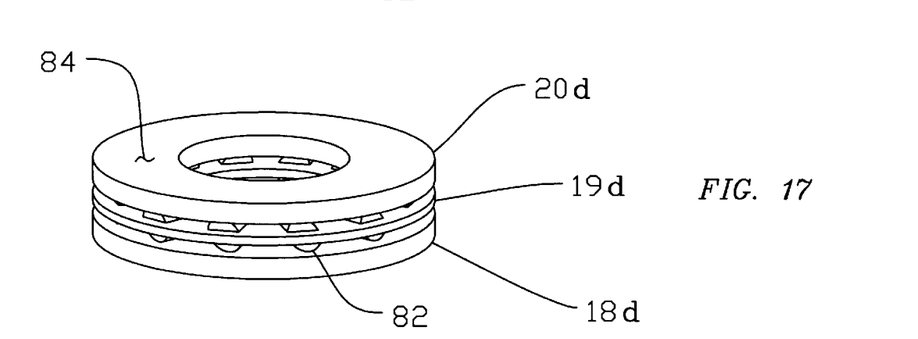
Figure 18:
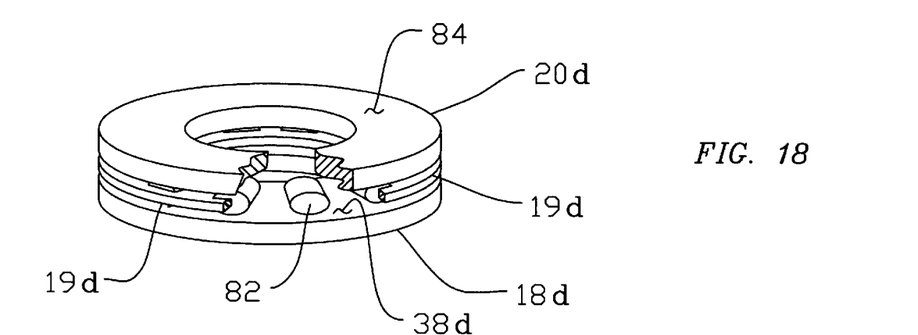

Another ramp structure 37d is illustrated in FIGS. 16–18, comprised of rigid members 18d, 20d and anti-friction means 19d confined therebetween. Member 18d might be rotatably keyed to a follower housing (not shown but like 13) while being axially movable relative to the follower housing and axially and rotatably movable relative to both the screw (not shown but like 12) and the adjacent member 20d, and member 20d might be threaded to cooperate with the screw. The members 18d, 20d might also have the respective adjacent faces (only 38d being shown) each substantially parallel and normal to the center axes of the members and contoured to accept the rollers 82 of the anti-friction means 19d. The rollers 82, loosely contained in a cage, would be elliptically shaped, defining opposed high position points 180 degrees apart at the major axis of the ellipse, and defining opposed low position points 180 degrees apart symmetrically at the minor axis of the ellipse. Rotation of the rollers 82 would thus axially shift the confining members 18d, 20d between the maximum expanded separation position illustrated in FIG. 16 with the opposite outward faces (only 84 being shown) and the minimum contracted separation position illustrated in FIG. 18, passing each time through an intermediate separation position illustrated in FIG. 17. It will be apparent that the offset of the elliptical rollers or the differential between the which and low position points need only be small, as the rotating rollers will create adjacent high and low position points each half rotation to provide two axial shifts between the outward faces for each revolution of the rollers, and the rollers might be rotated several times for each relative rotation between the associated screw and follower.

Of interest, each of the ramp structures disclosed herein can be made independently of its adjacent intermediate and drive members, by merely having the opposite adjacent faces on the intermediate and drive members made substantially flat and normal to the center axes of the members, allowing any of the different ramp structures to be fitted between and merely keyed to the separate intermediate and drive members. This would offer great universality of use and economy of construction, as identical drive and intermediate members could be used in different linear drives, and the selected ramp structure could be varied to provide specific axial shift distances and/or characteristics needed per relative rotation of the drive.

Figure 19:
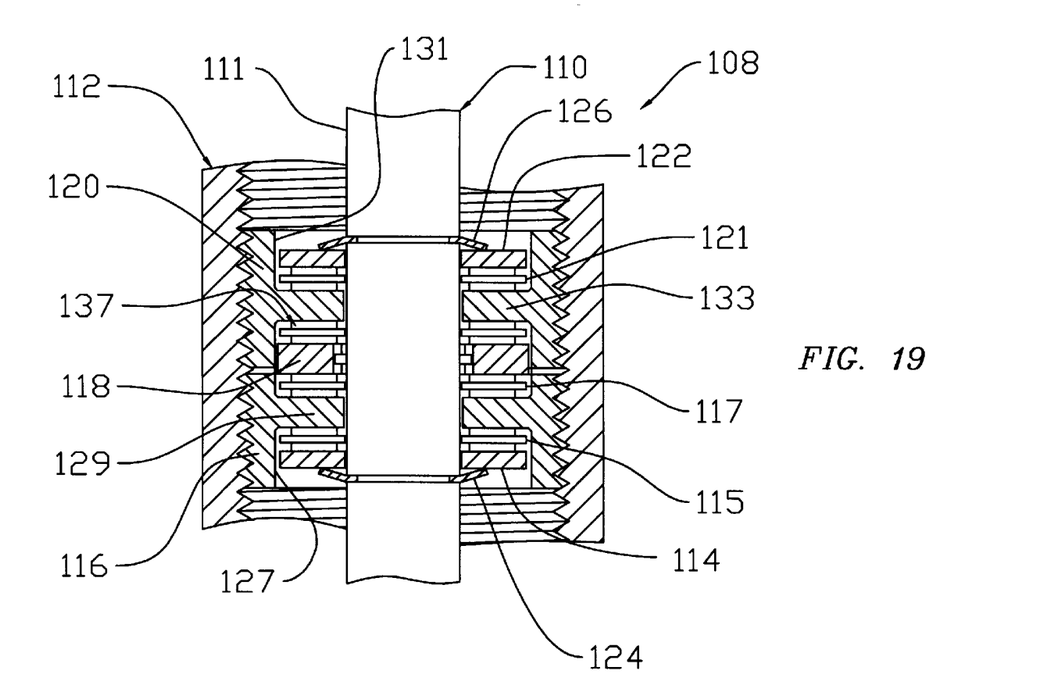
FIG. 19 is a central sectional view of a second embodiment of linear drive formed according to the invention.
Figure 20:
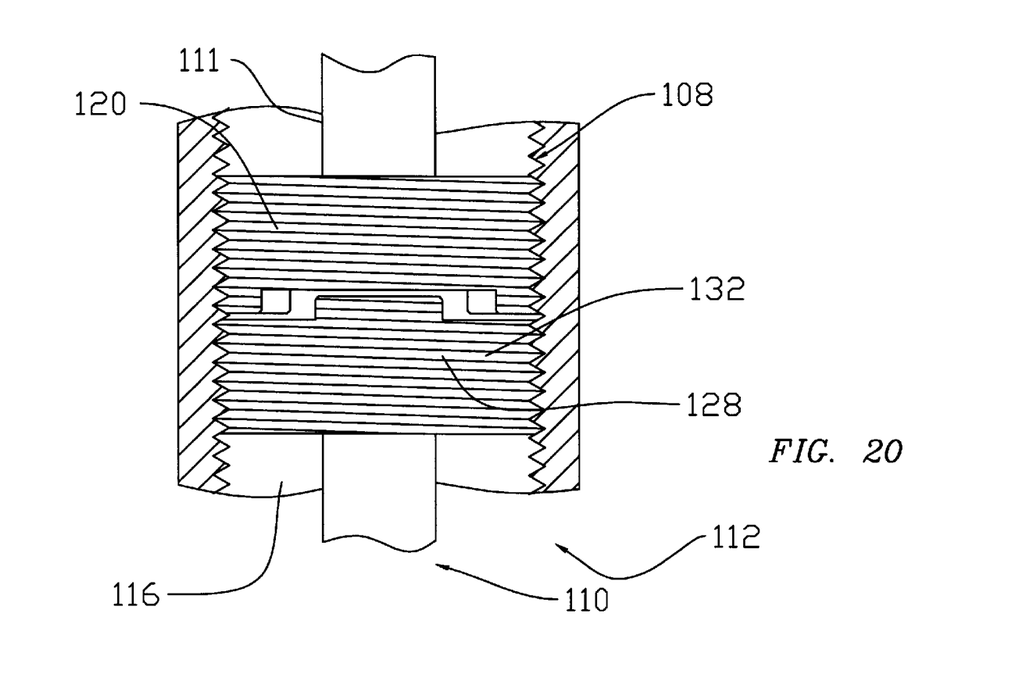
FIG. 20 is a sectional view similar to FIG. 19, except showing the two drive members of the follower in elevation, for added clarity of the invention.

A second embodiment of linear drive 108 formed according to the invention is illustrated in FIGS. 19 and 20, differing from linear drive 8 only in that the screw 112 is formed as an elongated tube having internal threads and the follower 110 is fitted inside of the tubular screw and has drive members 116 and 120 that are externally threaded to cooperate with the screw threads. The follower 110 further is illustrated as having an elongated rod 111 concentrically extended through the screw 112, the follower rod 111 having spaced grooves to receive spring retainers 124, 126 that resiliently contain therebetween spaced end thrust members 114, 122, the spaced threaded drive members 116, 120, and intermediate member 118. Anti-friction means 115, 117 and 121 separate the adjacent members 114, 116 and 120, 122 to allow rotation of the respective adjacent members relative to one another. A ramp structure (such as disclosed herein at 37, 37a, 37b, 37c, 37d) provided as at 137 between the intermediate member 118 and drive member 120 will operate to incrementally shift the members 116, 118 and 120 axially relative to one another upon relative rotation of the screw and follower. The follower end members 114, 122 will be rotatable relative to the screw and axially movable slightly relative to the follower, but will rotate with the follower rod. The drive members 116, 120 will have axially extended peripheral walls 127, 131 respectively, each threaded outside to cooperates with the screw, preferably over an axial extent along the screw. The adjacent ends of the member walls 127, 131 have intermitting tabs 128, 132 and notches to limit rotational movement of the members 116, 120 relative to one another. Rigid radial discs 129, 133 extended off of the drive member walls 127, 131 provide support for the axial force transferred via the rod 111 and respective force-carrying drive member 116 or 120 to the screw 112, while allowing free rotation and axial movement of the opposite loadfree drive member relative to the follower 110. The intermediate follower member 118 will be rotatably keyed to the follower 110, axially moveable relative to the follower, and will be axially and rotatably moveable relative to both the screw 112 and the adjacent drive members 116, 120. Relative rotation of the screw 112 and follower 110 will provide axial shifting incrementally between the drive members 116, 120, allowing threading of the loadfree member correspondingly along the screw, substantially as noted above regarding the linear drive 8.

The internally threaded tubular screw 112 might have particular advantage for linear drive usage in a hostile atmosphere, such as in extremely dusty or corrosive conditions, where an annular cap at each screw tube end and a seal fitted between the cap and smooth exterior surface of the follower rod 111 can enclose the cooperating threads for keeping them working smoothly while yet allowing rotational and/or axial shifting between the screw and follower. The exteriors of the tubular screw and follower rod can be appropriately treated or coated to withstand the atmosphere without breakdown or failure.

Figure 21:
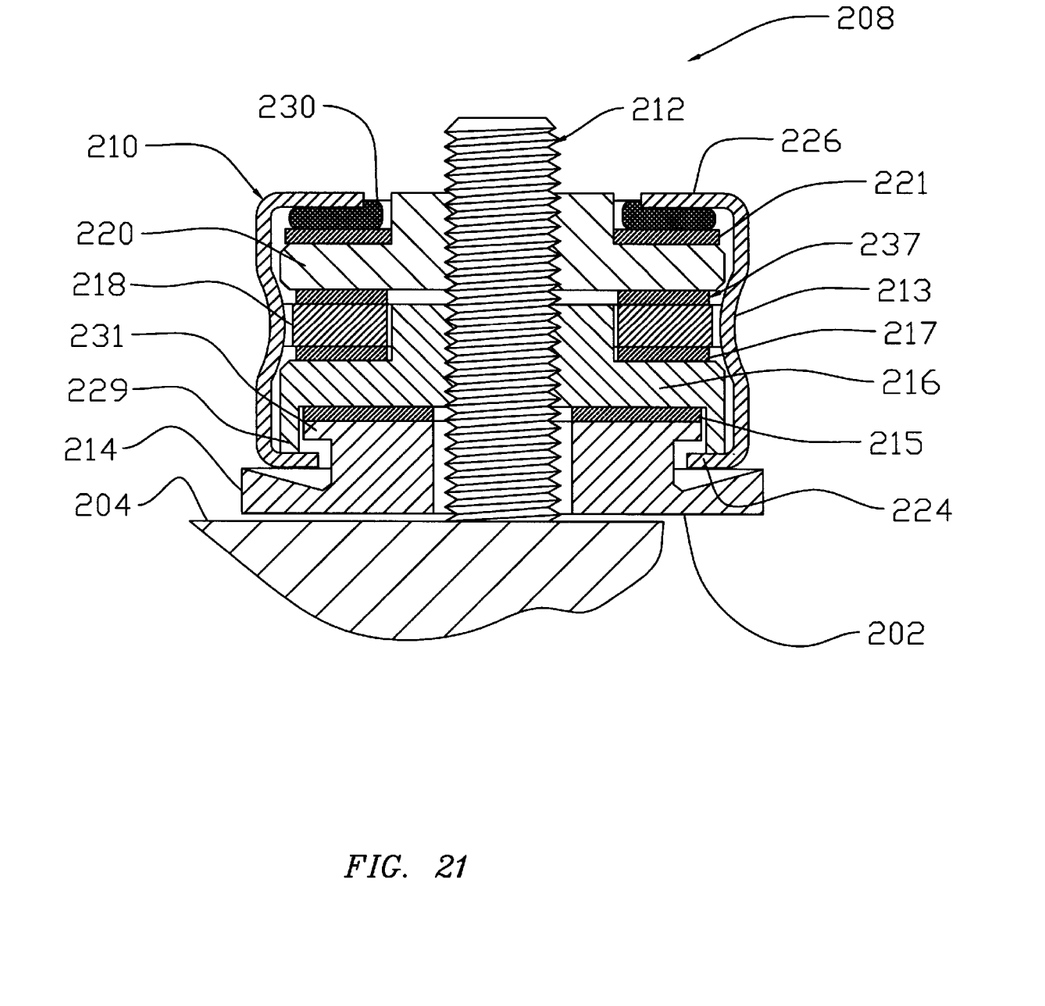
FIG. 21 is a central sectional view of a third embodiment of linear drive formed according to the invention.

A third linear drive 208 formed according to the invention is illustrated in FIG. 21, differing from the linear drives 8 and 108 in that end thrust member 214 is necked down to project beyond the end wall 224 of follower housing 213 and presents an exposed face 202 that can be tightened against an adjacent support 204, much in the manner of using follower 210 as a nut that might be threaded onto screw 212 disposed transverse to the support. The housing 213 illustrated is concentrically disposed relative to the screw 212, with opposite end walls or retainers 224, 226 axially holding drive members 216, 220, intermediate member 218, and thrust member 214 operatively together. Both drive members 216, 220 will cooperate threadably with the screw 212 to be axially advanced thereon when rotated on the screw, and intermediate member 218 will be disposed between the drive members 216, 220 and rotated with the housing 213 and will be axially movable relative to the drive members and housing. Anti-friction means 217 separate the intermediate member 218 from drive member 216, and ramp structure 237 (operable like any of the already disclosed ramp structures) separates the intermediate member 218 from drive member 220. The end retainer 224 of the housing radially overlies both an annular lip 229 of the drive member 216 and an annular flange 231 of the end thrust member 214 to hold the members together axially, while the end retainer 226 of the housing overlies and traps resilient spring material 230 against anti-friction means 221 riding on the drive member 220. The resilient spring material 230 axially biases the housing 213 to snug housing end wall retainer 224 against the drive member lip 229. Radial and axial clearances between the thrust member 214 and adjacent portions of the housing, drive member 216 and screw 212 allow rotation of the thrust member relative to the follower housing 213, even under large axial forces across anti-friction means 215. The anti-friction means 215, 217, and 221 can be of a low friction durable material such as Teflon or the like.

With the linear drive 208 operating as a nut, the follower 210 upon proper rotation on screw 212 might advantageously be rapidly advanced axially along the screw 212 (independently of the ramp structure 237 when no load is present to resist such advances), and then when the thrust member 214 encounters a resisting force can be advanced much slower but with large axial forces generated against the support 204. Because the ramp structure 237 can effectively generate large axial forces, and the shifting of the generated axial force alternately between the drive members with the axially stationary force-carrying member and the axially advancing loadfree drive member, a cumulative and significant clamping force buildup might be possible to create significant clamping by merely finger-tightening the follower; although a gripping tool obviously might also be used. The follower housing exterior might be hex-shaped or the like to cooperate nonrotatably with a conventional tool, or might be cylindrical but knurled for easier gripping (neither being shown). Of interest further, with the drive members 216, 220 being coupled together by interfitted tabs (not shown but like 28, 32 already noted herein), the limited free rotation of the drive members relative to one another upon reverse rotation of the follower nut on the screw could provide a reverse axial advance of the drive members on the screw to loosen the follower nut from the support and ultimately from the screw. However, by eliminating the interfitted tabs (not shown but like 28, 32 already noted herein) the drive members will be decoupled, so that relative rotation of the loadfree drive member trying to loosen the follower nut would be allowed but without any rotation of the force-carrying drive member and any actual loosening of the follower nut 210 from the support 204. This follower nut arrangement would provide a modified form of a lock nut, that can not be loosened merely by turning it in the normal manner. Such a follower nut could however be loosened by mechanically deforming the follower housing 213 to interlock then with both drive members, to rotate then simultaneously then with the follower housing, meaning that the linear drive nut 208 could be fabricated economically as a throw-away item to be discarded after its use.

Figure 22:
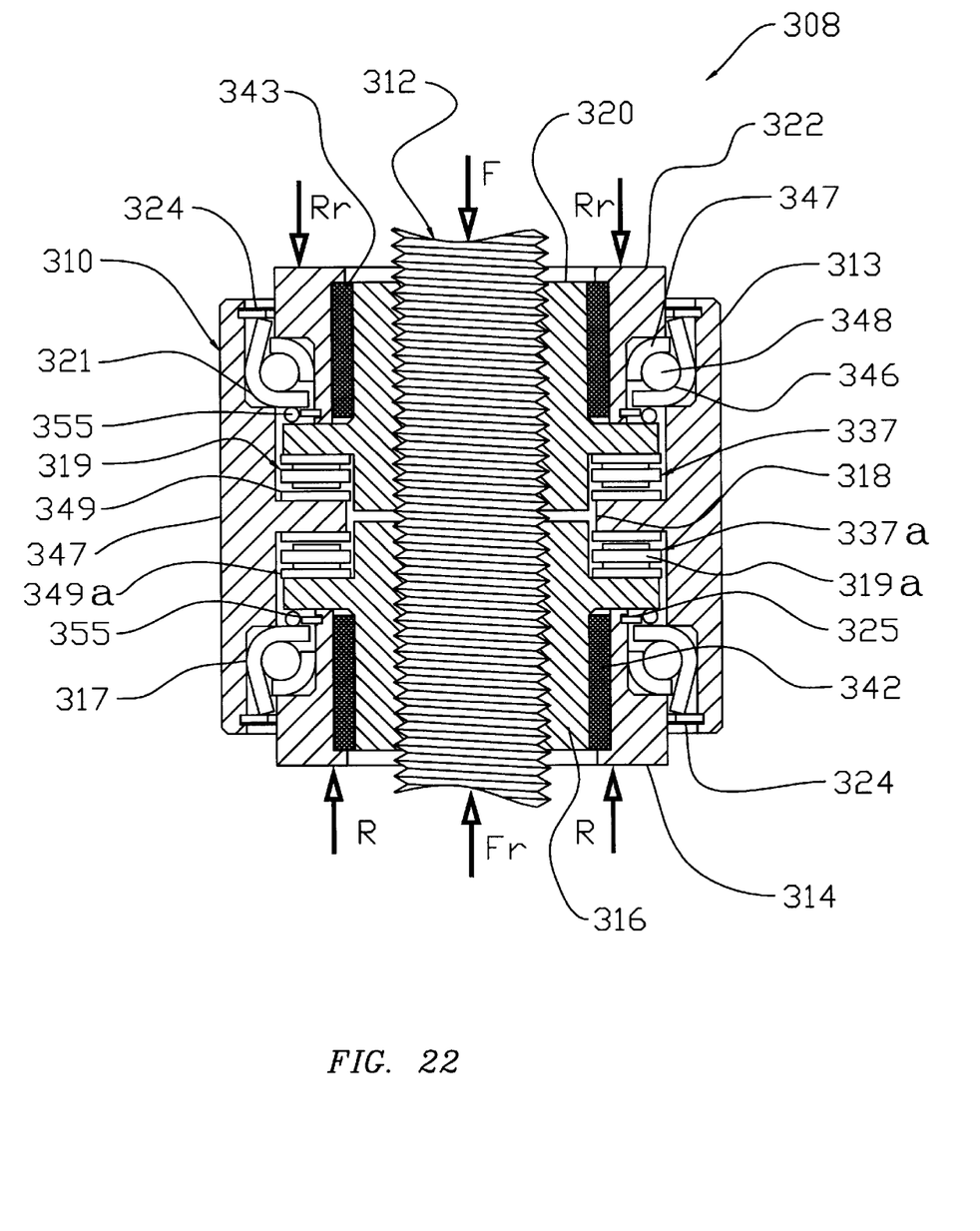
FIG. 22 is a central sectional view of a fourth embodiment of linear drive formed according to the invention.

A fourth embodiment of linear drive 308 formed according to the invention is illustrated in FIG. 22, differing from the previously disclosed linear drive 208 in ways that make it particularly suited to have follower components rotated under power relative to screw 312, as might occur in training a drive belt (not shown) around peripheral face 347 of axial wall 313 formed off of intermediate member 318, rotatably contained within follower 310. The follower 310 is comprised of opposite end thrust members 314, 322 held together by bolts 324 and projected beyond the ends of the intermediate member 318 and exposed suited for easy mounting of the follower relative to an independent support (not shown). Radial and axial anti-friction means 317, 321 provided between the end thrust members 314, 322 and intermediate member 318 allow follower rotation relative to the intermediate member 318, drive members 316, 320 and screw 312 while carrying both the lateral and axial forces applied between the screw and follower. The anti-friction means 317, 321 might have opposite races 346, 347 trapped between shoulders on the follower housing 313 and the end thrust members 314, 322, with bearing rollers 348 riding between the races. A resilient wavy ring washer or the like 355 trapped between each of the annular races 346 and the adjacent respective drive member 316, 320 serves as a spring to bias the drive members axially of the follower and toward the intermediate member 318, allowing slight axial shifting of the drive members 316, 320 relative to the intermediate member or follower housing and/or the end thrust members 314, 322 during operation of ramp structures 337, 337a respectively trapped between the radial wall of intermediate member and drive members 316, 320. The drive members 316, 320 preferably will be coupled together by interfitted tabs (not shown but like 28, 32 already noted herein). Each ramp structure 337, 337a might be comprised of any of the previously disclosed related structures (37, 37a, 37b, 37c or 37d) and thus might include some form of anti-friction means (not shown) that would allow relative rotation of the respective drive member 316 or 320 and the intermediate member 318 and some sort of repeating ramps or inclines that would create axial forces and incremental shifts between the members upon such relative rotation. Intermediate member 318 is made as a unitary part of the follower wall 313, obviously then rotating with the follower but also then having a fixed axial position relative to the follower 310 and the end thrust members 314, 322. With this arrangement, the axial forces F, R from the screw to the follower 310 will be directed through the ramp structure 337a to intermediate member 318 and the unitary housing wall 313 and across the anti-friction means 321 to the end thrust member 314 (when drive member 320 is the force-carrying member); and from the screw either across the spring means 355 and through anti-friction means 321 or through the race 347 of the anti-friction means 321 directly to the end thrust member 314 (when drive member 316 is the force-carrying member). Alternatively, the axial forces Fr, Rr from the screw to the follower 310 will be directed through the ramp structure 337 to intermediate member 318 and the unitary housing wall 313 and across the anti-friction means 317 to the end thrust member 322 (when drive member 316 is the force-carrying member); and from the screw either across the spring means 355 and through anti-friction means 317 or through the race 347 of the anti-friction means 317 directly to the end thrust member 322 (when drive member 320 is the force-carrying member). With the two ramp structure 337, 337a disposed on opposite sides of the intermediate housing wall, only one ramp structure 337 or 337a will be operable at a time: ramp structure 337a when the linear drive is being operated under the F, R force conditions, and ramp structure 337 when the linear drive is being operated under the Fr, Rr force condition, when the directions of the axial forces F, R or Fr, Rr are reversed.

While specific embodiments have been illustrated and discussed, minor changes could be made in an overall assembly without departing from the spirit of the inventive teaching. Accordingly, the invention is to determined by the scope of the following claims.

What is claimed is:

1. In a linear drive utilizing a threaded screw and a follower cooperating threadably therewith, operable upon powered relative rotation of the follower and screw for moving the follower axially along the screw with up to a maximum axial driving force, an improved linear drive follower comprising a pair of drive members axially spaced apart and threadably cooperating with the screw for rotation to provide axial movement along the screw, an intermediate member disposed axially between the drive members, means including a housing containing the drive members at a maximum separation from one another and allowing axial drive member movement therefrom a limited first axial distance to a minimum axial separation from one another, and anti-friction means between the respective adjacent members and housing allowing rotation of the adjacent members relative to one another and said housing while supporting said maximum axial driving force;

shift means for expanding and contracting, by a second axial distance up to the first axial distance, the axial separation between the drive members, and the shift means generating the maximum axial drive force needed between the follower and screw;

the intermediate member and housing being rotated with the follower relative to the screw upon operation of the linear drive, and means to bias each drive member concurrently to rotate in the same direction but with a limited force effective to overcome thread friction drag between the drive member and screw only with said drive member being substantially loadfree and carrying a minor percentage of said maximum driving axial force but ineffective to overcome thread friction drag between the drive member and screw with said drive member carrying a major percentage of said maximum driving axial force;

whereby simultaneous powered rotation unidirectionally between the screw and follower and cyclic operation of the shift means provide for cyclically expanding and contracting the axial separation between the drive members, effective for cyclically shifting the respective axial forces carried by the respective drive members between one drive member that will then be friction bound against the screw and the other drive member that will then be substantially loadfree to be rotated relative to the screw and shifted therealong an axial distance up to said second axial distance, effective for incrementally advancing the then loadfree drive member and follower axially along the screw.

2. A linear drive follower according to claim 1, further comprising means coupling the drive members together to allow only limited rotation relative therebetween corresponding to slightly less than the rotational angle needed for completing either the expanding or contracting separation of the shift means.

3. A linear drive follower according to claim 1, further comprising the drive members containing means including means resiliently and continuously biasing the drive members, intermediate member and the anti-friction means axially against one another and axially inwardly from the housing containment.

4. A linear drive follower according to claim 1, further comprising said shift means having circumferential ramp structure having complementary axial highs and lows providing a ramp rise of said second axial distance, and the follower rotation relative to the screw cyclically activating the ramp structure and the axial separation between the drive members.

5. A linear drive follower according to claim 4, the ramp rise at its maximum is one-half the screw thread lead for a ramp structure having one set of complementary highs and lows per relative revolution of the screw and follower; or for a ramp structure having more than one set of equally spaced complementary highs and lows per relative revolution of the screw and drive members, is the fraction equal to one-half divided by the number of complementary highs and lows Per relative revolution of the screw and follower.

6. A linear drive follower according to claim 1, further comprising the drive member containing means including a pair of thrust members disposed axially remote of the drive members and contained also by the housing, and anti-friction means between the respective adjacent thrust and drive members allowing rotation of these adjacent members relative to one another while supporting said maximum axial driving force.

7. A linear drive follower according to claim 1, further comprising the drive member containing means including a pair of thrust members disposed axially remote of the drive members and contained also by the housing, anti-friction means between the respective adjacent thrust and drive members and between the respective adjacent thrust member and housing allowing rotation of these adjacent members relative to the housing, and the thrust members and the housing being rotatable relative to one another and the screw.

8. A linear drive follower according to claim 7, further comprising the housing and the intermediate member effectively being unitary operable to rotate together as a unit, and the means resiliently biasing each thrust and drive member and the antifriction means axially therebetween axially inwardly from the drive member containment means toward the intermediate member.

9. A linear drive follower according to claim 1, further comprising the drive member containing means including a thrust member disposed axially remote of the other drive member from the shift means and contained also by the housing, anti-friction means between the adjacent thrust and other drive members allowing rotation of these adjacent members relative to one another and the housing, the thrust member projecting beyond the housing and presenting an exposed face axially beyond the housing, for operation of the linear drive as a nut with the thrust member face tightened down against an object axially fixed relative to the screw.

10. In a linear drive utilizing a threaded screw and a follower cooperating threadably therewith, operable upon powered relative rotation of the follower and screw for moving the follower axially along the screw with up to a maximum axial driving force, an improved linear drive follower comprising a pair of drive members axially spaced apart and threadably cooperating with the screw for rotation to provide axial movement along the screw, an intermediate member disposed axially between the drive members, means including a housing containing the drive members at a maximum separation from one another and allowing axial drive member movement therefrom a limited first axial distance to a minimum axial separation from one another, anti-friction means between the respective adjacent members and housing allowing rotation of the adjacent members relative to one another and said housing while supporting said maximum axial driving force, and means resiliently and continuously biasing the drive members, intermediate member and the anti-friction means axially against one another and axially inwardly from the housing containment;

shift means for expanding and contracting, by a second axial distance up to the first axial distance, the axial separation between the intermediate member and the drive members, and the shift means generating the maximum axial drive force needed between the follower and screw;

the intermediate member and housing being rotated with the follower relative to the screw upon operation of the linear drive, and each drive member concurrently being biased to rotate in the same direction but with a limited force effective to overcome thread friction drag between the drive member and screw only with said drive member being substantially loadfree and carrying a minor percentage of said maximum driving axial force but ineffective to overcome thread friction drag between the drive member and screw with said drive member carrying a major percentage of said maximum driving axial force, and means coupling the drive members together to allow only limited relative rotation therebetween corresponding to slightly less than the rotational angle needed for completing either the expanding or contracting separation of the shift means;

whereby simultaneous powered rotation unidirectionally between the screw and follower and cyclic operation of the shift means provide for cyclically expanding and contracting the axial separation between the drive members, effective for cyclically shifting the axial force carried by the drive members between one drive member that will then be friction bound against the screw and the other drive member that will then be substantially loadfree to be rotated relative to the screw and shifted therealong an axial distance up to said second axial distance, effective for incrementally advancing the then loadfree drive member and follower axially along the screw.

11. A linear drive follower according to claim 10, further comprising said shift means having circumferential ramp structure having complementary axial highs and lows providing a ramp rise of said second axial distance, and the follower rotation relative to the screw cyclically activating the ramp structure and the axial separation between the drive members.

12. A linear drive follower according to claim 11, the ramp rise at its maximum is one-half the screw thread lead for a ramp structure having one set of complementary highs and lows per relative revolution of the screw and follower; or for a ramp structure having more than one set of equally spaced complementary highs and lows per relative revolution of the screw and drive members, is the fraction equal to one-half divided by the number of complementary highs and lows per relative revolution of the screw and follower.

13. A linear drive follower according to claim 10, further comprising the drive member containing means including a pair of thrust members disposed axially remote of the drive members and contained also by the housing, and anti-friction means between the respective adjacent thrust and drive members allowing rotation of these adjacent members relative to one another while supporting said maximum axial driving force.

14. A linear drive follower according to claim 10, further comprising the drive member containing means including a pair of thrust members disposed axially remote of the drive members and contained also by the housing, anti-friction means between the respective adjacent thrust and drive members and between the respective adjacent thrust member and housing allowing rotation of these adjacent members relative to the housing, and the thrust members and the housing being rotatable relative to one another and the screw.

15. A linear drive follower according to claim 14, further comprising the housing and the intermediate member effectively being unitary operable to rotate together as a unit, and the means resiliently biasing each thrust and drive member and the anti-friction means axially therebetween axially inwardly from the drive member containment means toward the intermediate member.

16. A linear drive follower according to claim 10, further comprising the drive member containing means including a thrust member disposed axially remote of the other drive member from the shift means and contained also by the housing, anti-friction means between the adjacent thrust member and other drive member allowing rotation of these adjacent members relative to one another and the housing, the thrust member projecting beyond the housing and presenting an exposed face axially beyond the housing, for operation of the linear drive as a nut with the thrust member face tightened down against an object axially fixed relative to the screw.

* * * * *